United States Patent
Forest

(10) Patent No.: US 8,522,723 B2
(45) Date of Patent: Sep. 3, 2013

(54) SMALL ANIMAL EXERCISE DEVICES

(76) Inventor: Austin J. Forest, Boulder, CO (US)

( * ) Notice: Subject to any disclaimer, the term of this patent is extended or adjusted under 35 U.S.C. 154(b) by 0 days.

(21) Appl. No.: 13/489,080

(22) Filed: Jun. 5, 2012

(65) Prior Publication Data

US 2012/0242256 A1 Sep. 27, 2012

Related U.S. Application Data

(62) Division of application No. 12/784,189, filed on May 20, 2010, now Pat. No. 8,191,511.

(51) Int. Cl.
*A01K 15/02* (2006.01)
(52) U.S. Cl.
USPC .......................................... 119/704; 119/421
(58) Field of Classification Search
USPC ......... 119/700–704, 421, 422, 452; 446/129, 446/130, 136, 242; 472/14, 15, 26, 44–46; 185/17; 104/68
See application file for complete search history.

(56) References Cited

U.S. PATENT DOCUMENTS

| | | | |
|---|---|---|---|
| 954,339 | A | 4/1910 | Peters |
| 3,682,477 | A | 8/1972 | Harkins |
| 4,064,839 | A | 12/1977 | Rodemeyer et al. |
| 4,171,682 | A | 10/1979 | Merino et al. |
| 5,649,503 | A | 7/1997 | Woolfolk |
| 2011/0162586 | A1 | 7/2011 | Ho |

OTHER PUBLICATIONS

In the US Patent and Trademark Office U.S. Appl. No. 12/784,189 Non-Final Office Action dated Nov. 7, 2011, 9 pages.

*Primary Examiner* — Kristen C Hayes
(74) *Attorney, Agent, or Firm* — Patton Boggs LLP

(57) ABSTRACT

An animal exercise wheel is illuminated by LEDs connected to a battery via a reed switch. A magnet actuates the reed switch when an animal begins to rotate the wheel. The LEDs flash with the frequency of rotation of the animal wheel or continuously. As long as the wheel rotates, the magnet continues to actuate the reed switch, which resets a counter. When the wheel stops and the reed switch is no longer actuated, the counter counts a predetermined time, and terminates the illumination of the LEDs.

6 Claims, 8 Drawing Sheets

SMALL ANIMAL EXERCISE DEVICES

CROSS-REFERENCE TO RELATED APPLICATIONS

This application is a divisional application of U.S. patent application Ser. No. 12/784,189 filed May 20, 2010 now U.S. Pat. No. 8,191,511.

BACKGROUND OF THE INVENTION

1. Field of the Invention

This invention relates in general to small animal exercise devices, such as mouse exercise wheels, and more particularly to such devices that include electrical lights.

2. Background of the Invention

Exercise wheels that small animals, such as mice or hamsters, can climb into and turn by themselves are well known and are sold in nearly every pet store. The invention was created because the inventor, who is currently twelve years old, has a twin sister who raises mice. One evening, while the inventor watched his sister's mice spin their exercise wheels, he thought it would be nice if the turning of the wheel generated electricity while spinning the wheel. He told his idea to his father, who is a patent attorney with many clients who are inventors. The inventor's father and one of the clients, who is an expert in LED lighted devices, tried to design a mouse wheel with a small electrical generator that would generate enough electricity to light several LEDs. This attempt was not successful, because every device that could be imagined cost too much to build to make it a viable commercial product. Some time later, the inventor found on the Internet several examples of mouse wheels that turned an electrical generator. All of these were so complex that they would tend to be unreliable; in fact, one example failed during tests in a Youtube video. In addition, all of the animal wheels with electrical generators would cost so much to manufacture that they would have to be sold at a price at which parents would balk and which would not be acceptable in pet stores. This is likely the reason that no lighted pet wheels are presently commercially available.

SUMMARY OF THE INVENTION

The inventor was not deterred by the lack of success of his father and his father's client as well as the adults who built lighted mouse wheels and displayed them on the Internet. He was determined to make a lighted mouse wheel for his sister. He reasoned that by using a battery, LEDs, and some kind of switch, he could fool his sister into thinking that her mice were generating electricity when they turned their wheels. He searched the Internet for switches, but found mechanical switches he did not think would work well. He has always been fascinated by the ability of magnets to move magnetic materials at a distance without physical contact. He searched the Internet for magnetic switches and discovered reed switches. His father contacted a company that made reed switches and obtained several samples. The inventor got a battery pack and some LEDs at Radio Shack, soldered together a simple circuit, put some magnets on one of his sister's mouse wheels, and it worked remarkably well on first try. The parts that he used cost a total of approximately $4.00 at Radio Shack, so it was clear that, if parts were bought wholesale and built in volume, the cost would be under a dollar; and a commercial product could be manufactured at a cost that was acceptable by parents and at pet stores.

The invention provides an animal wheel that is simple, reliable, and can be built at a cost that makes it commercially useful. With the animal wheel according to the invention, we have discovered that most children, and, in fact, most people are amused, if not fascinated, by an animal wheel that lights up when the animal turns it. Most think that, because the lights light up only when the wheel turns, and go out when the wheel stops, the electricity that lights the wheel is generated by the animal turning the wheel.

The inventor has found that it is not necessary that the animal actually generate electricity when turning the wheel, but only that it is evident that the action of the animal turning the wheel activates the light or lights. The animal wheel according to the invention includes a power source, such as a battery, and one or more lights that are illuminated by the power source. The lights are switched on by the action of the animal turning the wheel, and switched off when the wheel stops. Preferably, the light or lights are LEDs. Preferably, the lights turn on and off with a frequency that depends on the speed of the wheel. This assists in creating the illusion that the mouse is generating the electricity to turn the wheel. However, the inventor has also discovered that an embodiment in which the lights stay lighted continuously as long as the wheel turns, and turns off quickly when the wheel stops, also strongly creates the illusion that the wheel is generating the electricity that lights the lights. This illusion, in any of the embodiments, that the animal is generating electricity by turning the wheel, greatly increases the enjoyment of the animal owner.

In a simple embodiment, the invention provides a power source, such as a battery; one or more lights, such as LEDs; a switch connecting the battery and the power source; and a switch activator that activates the switch when the wheel turns. Preferably, the switch is a reed switch and the switch activator is a magnet.

The invention provides an animal exercise wheel comprising: a rotatable cage having an opening that can be entered by an animal weighing five pounds or less; the cage capable of being rotated by the animal; one or more lights; a battery; a switch connecting the one or more lights and the battery; and a switch actuator; wherein one of the switch and the switch actuator is mounted on the rotatable cage and the other one of the switch and the switch actuator is located on a non-moving surface adjacent to the animal cage and sufficiently close to the rotatable cage that the switch can be actuated by the switch actuator. Preferably, the switch is a reed switch and the switch actuator is a magnet. Preferably, the magnet is mounted on the animal wheel and the reed switch is in or on housing adjacent to the animal wheel. Preferably, the reed switch is mounted on the animal wheel and the magnet is located adjacent to the animal wheel. Preferably, the animal exercise wheel further includes housing and the battery; the switch and the lights are enclosed by or supported on the housing. Preferably, the housing fits under the animal wheel and the switch actuator is mounted on the animal wheel. Preferably, the housing is attached to the animal wheel. Preferably, the lights are mounted on the animal wheel. Preferably, weight is distributed on the rotatable cage so that it tends to stop in a position wherein the switch and switch actuator are sufficiently separated so the switch actuator cannot actuate the switch.

The invention also provides a method of lighting a rotatable animal wheel, the method comprising: providing one or more lights; triggering the illumination of the one or more lights by the rotation of an animal wheel; and stopping the illumination of the one or more lights when the animal wheel stops rotating. Preferably, the illumination begins within two seconds of the animal wheel beginning to rotate. Preferably, the illumination stops within two seconds of the animal wheel ceasing rotating. Preferably, the triggering comprises switching a reed switch with a magnet, and the stopping comprises turning off the illumination with a second switch when the reed switch fails to open within a predetermined time. Preferably, the illumination is continuous between the triggering and the stopping. Preferably, the illumination comprises flashing the lights at a frequency determined by the speed of rotation of the animal wheel.

The invention also provides a kit for lighting a rotatable animal wheel, the kit comprising: a magnet; a housing; a plurality of battery contacts; one or more LEDs; a reed switch connected between one of the battery contacts and the one or more LEDs; the plurality of battery contacts, the one or more LEDs, and the reed switch are contained in or supported by the housing; and an attachment device for attaching either the magnet or the housing to a rotatable animal wheel. Preferably, the attaching device attaches the magnet to the animal wheel. Preferably, the attaching device attaches the housing to the animal wheel.

In addition to providing, for the first time, a battery-powered lighted animal wheel, the invention provides several other innovative features. For example, it provides a lighted animal wheel in which the lighting is triggered when an illumination switch is adjacent to a switch actuator, which also turns off the lights if the wheel stops in a position in which the switch actuator is adjacent the switch actuator and thus would otherwise keep the light(s) illuminated. As another example, it provides a lighted animal wheel in which the lighting is triggered when an illumination switch is adjacent to a switch actuator, which holds the light(s) continuously activated until the wheel stops, which is determined by the fact that the switch stops sending triggering signals for a predetermined time, such as two seconds, or more preferably a second, and most preferably a half-second.

The invention not only provides a lighted animal wheel that is much more attractive to children and other people than any previous animal wheel, but also provides a lighted animal wheel that is not very complex and, thus, lends itself to manufacturing. Numerous other advantages and features of the invention will become apparent from the following detailed description when read in conjunction with the drawings.

BRIEF DESCRIPTION OF THE DRAWINGS

FIG. 4 is a flow chart showing a preferred embodiment of a process according to the invention for turning off the lights of an animal wheel according to the invention if the animal stops turning the wheel while the lights are on;

DETAILED DESCRIPTION OF THE PREFERRED EMBODIMENT

Figure 1:
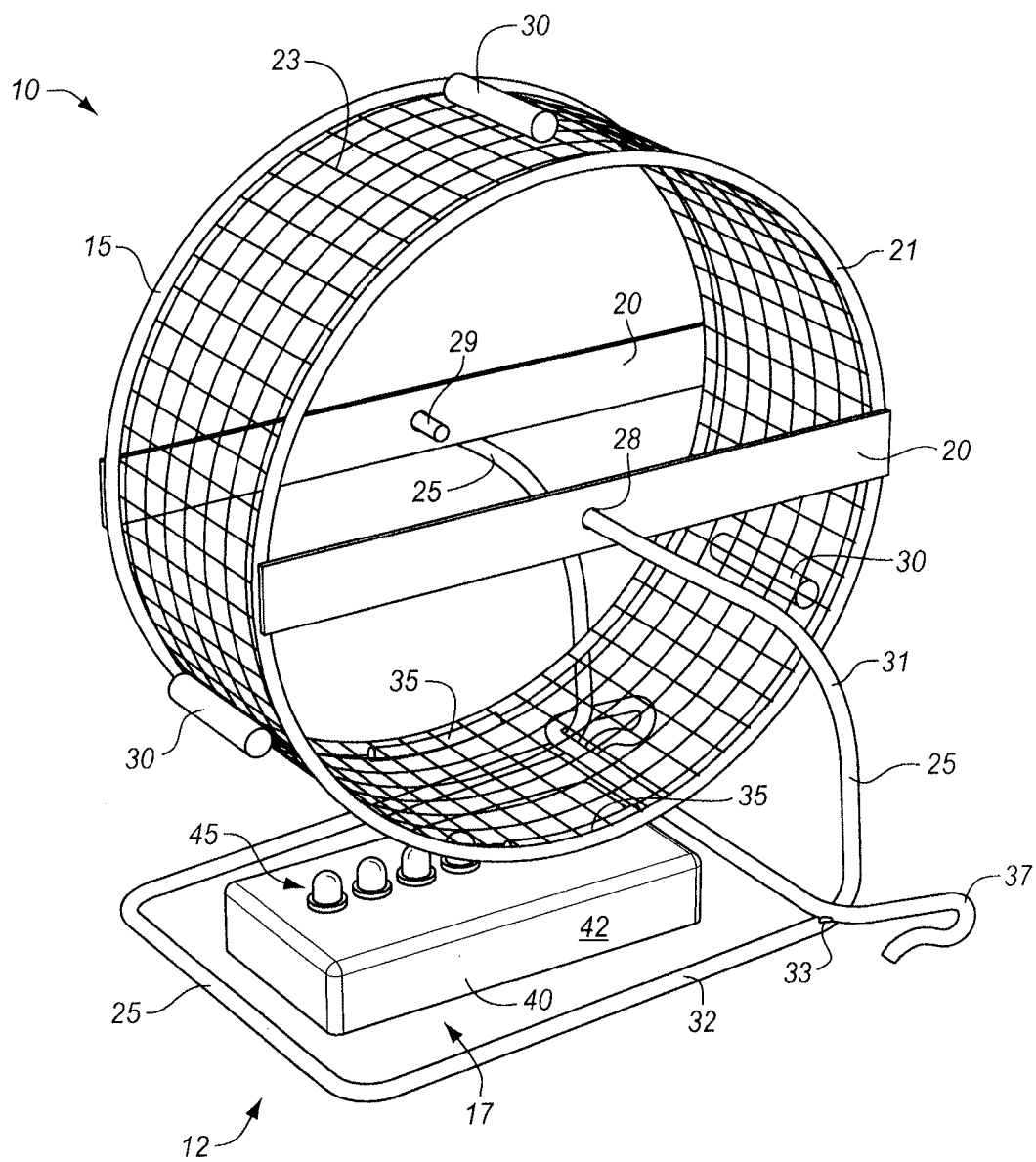
FIG. 1 is a perspective view of a preferred embodiment of a combination of an animal wheel with an aftermarket kit according to the invention for lighting the system responsive to the animal turning the wheel.

FIG. 1 is a perspective view of a preferred embodiment 10 of a combination of an animal wheel 15 with a lighting system 12. The lighting system 12 includes a lighting circuit module 40 and actuators 30 which, in this embodiment, are magnets. System 12 is an example of an after-market lighting system according to the invention that can be added to almost any animal wheel 15. Lighting system 10 illuminates lights 45 responsive to the animal turning the wheel 15. Lights 45 are preferably LEDs. It is understood that this embodiment and other embodiments described in this disclosure are exemplary. It is not intended that the invention be limited to the specific embodiments. Rather, the description is intended to fulfill the disclosure requirements of the patent law. It is also understood that the drawings do not in all cases represent the relative sizes of the various parts, but that adjustments have been made to better explain the invention. For example, the housing 42 in FIG. 2 is much larger as compared to the size of wheel 15 than an actual commercial housing so that it can contain the various circuit elements without lack of clarity due to crowding and/or small print.

Continuing with the description of FIG. 1, wheel 15 includes support beams 20, rims 21, and mesh structure 23. Wheel 15 is supported by wheel support 25, which includes arms 31, foot 32, and axle 29, which in this embodiment comprises the distal end of arm 31 bent at right angles to the arm. Holes 28 are formed in beams 20, and axels 29 rotatably fit in holes 28. Brace 37 is preferably a little wider than foot 32 to provide lateral support and is welded to the foot at 33. In this embodiment, wheel support 25 and brace 37 comprise a heavy wire. Wheel 15, in this embodiment, is a conventional mouse wheel that currently can be found in most pet stores that sell mice. Any other suitable mouse, rat, hamster, or other small animal wheel may be substituted. In this disclosure, "small animal wheel" means an animal wheel suitable for an animal weighting three pounds or less, preferably less than a pound, and most preferably less than half a pound.

Animal wheel 15 is converted to a lighted animal wheel by lighting system 12. Lighting circuit module 40 is placed in the foot cavity 17, and magnets 30 are affixed to wheel mesh 23, preferably by epoxy or other strong glue. Lighting circuit module 40 includes a circuit 143, such as shown in FIG. 2, enclosed in a plastic enclosure 42, with the LEDs 45 of the circuit extending through the top of the enclosure. In a more preferred embodiment, the magnets are manufactured with a built-in clasp that mechanically attaches them to the wheel mesh 23. The magnets may also be attached to one of the rims 21, one of the arms 20, or any other moving part of the wheel 15. As will be described in FIG. 2, when wheel 15 is spun by the animals, magnets 30 move across lighting circuit module 40.

Figure 2:
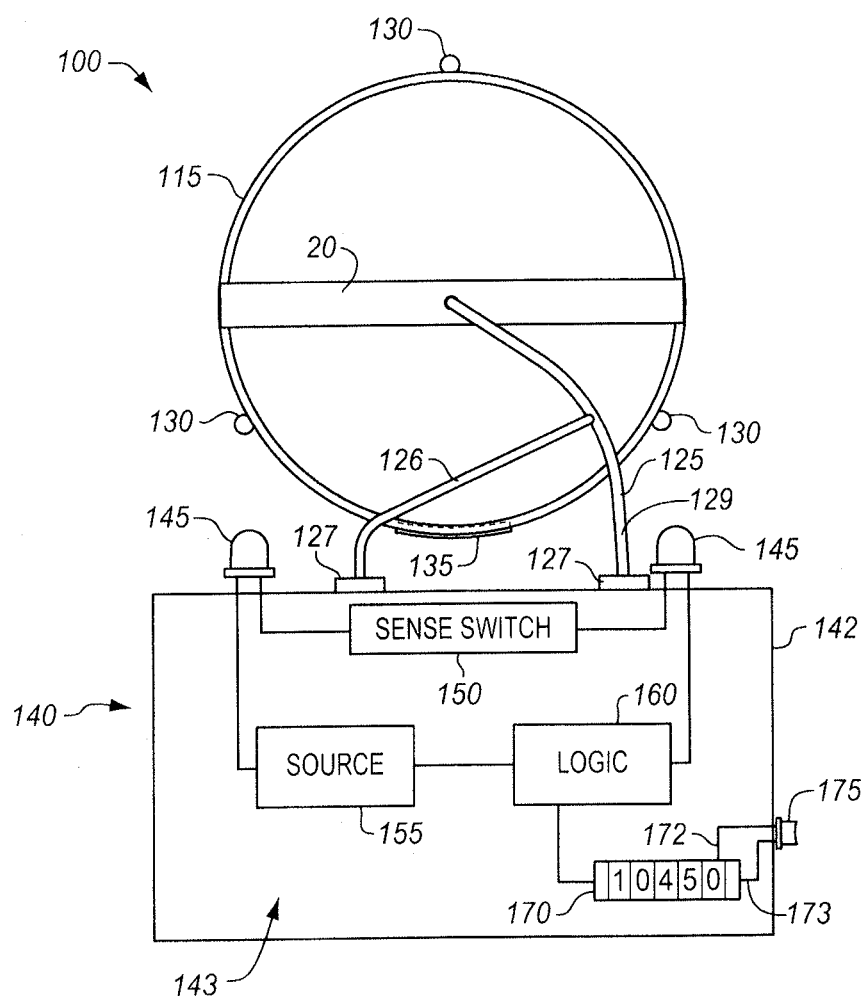
FIG. 2 is a plan view of a preferred embodiment of an integrated animal wheel and illumination system according to the invention that is illuminated by an animal turning the wheel.

A problem that can occur with the lighted animal wheel system 10, 100 and the circuit 143 of FIG. 2 is that when the mouse or other animal stops spinning the wheel, the wheel can stop with one of the magnets directly over lighting module 40, 140. This will cause the light to stay on, which wastes battery power, but also negatively affects the illusion that the mouse is generating the power to light the lights. This illusion has been found to be an important part of the attraction of the device. The illusion can be maintained by applying a small weight 35, 135 to a portion of the wheel between magnets 30, 130. This causes the wheel to always stop with the weight down, which is a lights off position. Alternatively, magnets 30, 130 can be attached slightly asymmetrically, so that for balance, the wheel always stops with the magnets away from module 40, 140. As another alternative, a few extra crosspieces of the mesh 23 can be placed in one area of the mesh spaced from the magnets, so that portion of the mesh is slightly heavier. As another example, the hole 28 and axel 29 can be formed with a flat or other shaped area that causes the wheel 15 to stop with the magnets away from the lighting module. Any other suitable method or apparatus to cause the animal wheel to stop with the magnets away from lighting module 40, 140 may be used.

FIG. 2 is a plan view of another preferred embodiment of an animal wheel system 100 according to the invention. The system 100 is similar to system 10 of FIG. 1, except that it is mounted on top of lighting module case 142 via legs 125 and 126, the distal ends, such as 129, of which are attached to case 142 of housing module 140 with studs 127. Lighting module case 142 preferably is made of plastic. Lighting circuit 143 comprises lights 145, sense switch 150, power source 155, logic 160, counter 170, and reset switch 175. Preferably, lights 145 are LEDs, sense switch 150 is a reed switch, power source 155 is a battery pack, and logic 160 is a pulse generator suitable to generate pulses in response to the circuit turning on, which pulses can be counted by counter 170. In the embodiment of FIG. 2, logic 160 also includes a divider that divides the number of times the circuit turns on by three, so that one pulse is generated for each revolution of wheel 115. Preferably, counter 170 is an electronic counter, and reset switch 175 is a switch which applies a reset pulse to counter 170. Logic 160, counter 170, and reset switch 175 all are powered by source 155, though the connections are conventional and, therefore, are not expressly shown. Preferably, reed switch 150 is a normally open reed switch, though, from this disclosure, one skilled in the art would also know how to use a normally closed reed switch for this application. In one preferred embodiment, battery pack 155 is a 3V battery pack using two AA batteries. In the embodiment of FIG. 2, reed switch 150, LEDs 145, source 155, and logic 160 are connected in series; and a pulse output of logic 160 is connected to counter 170. However, in the more preferred embodiment, the LEDs are connected in parallel as in FIG. 3. Switch 175 is connected across the reset input 172 and the ground 173 of counter 170.

Figure 3:
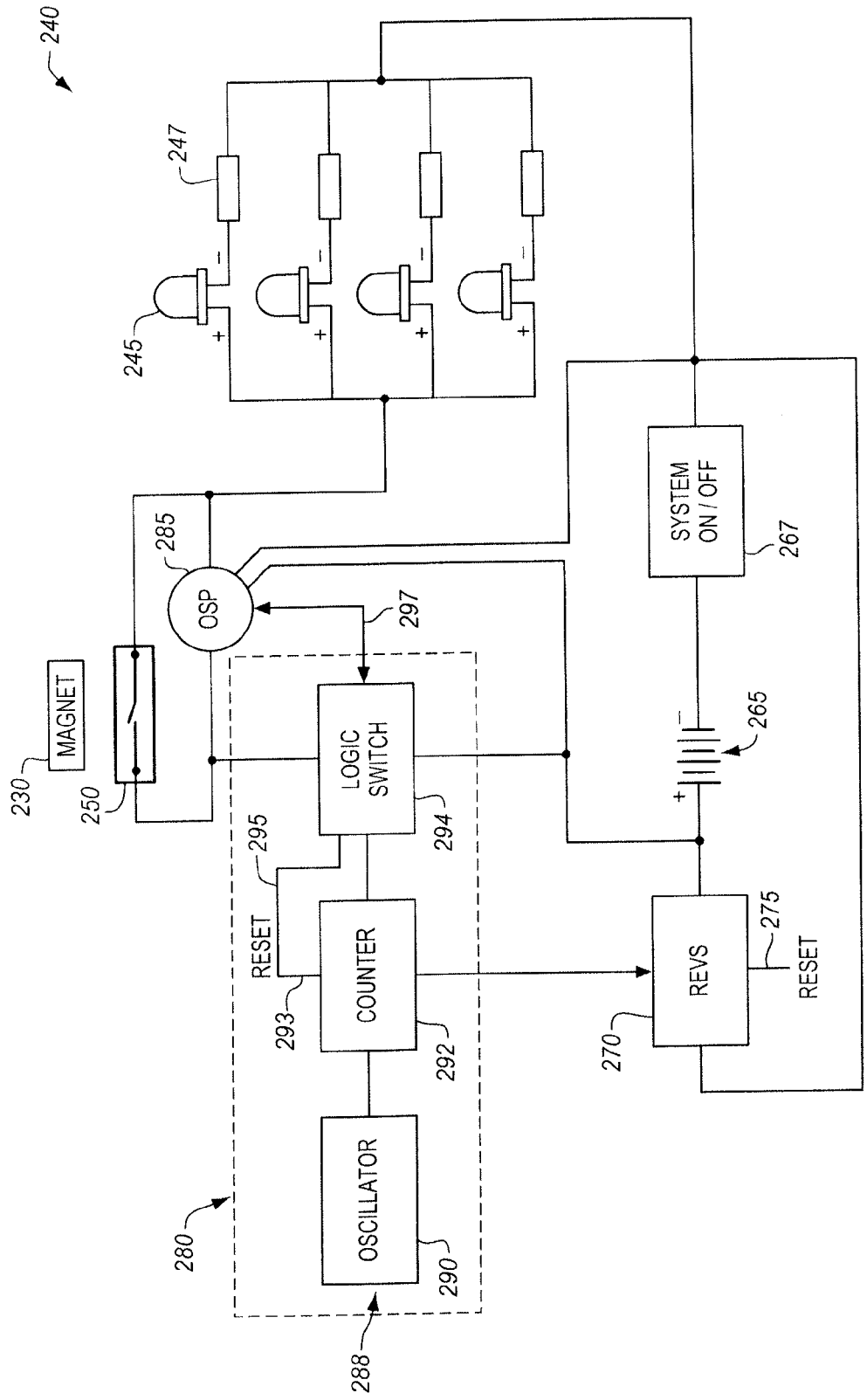
FIG. 3 is an electronic diagram of a preferred embodiment of a system according to the invention for lighting an animal wheel.
Figure 4:
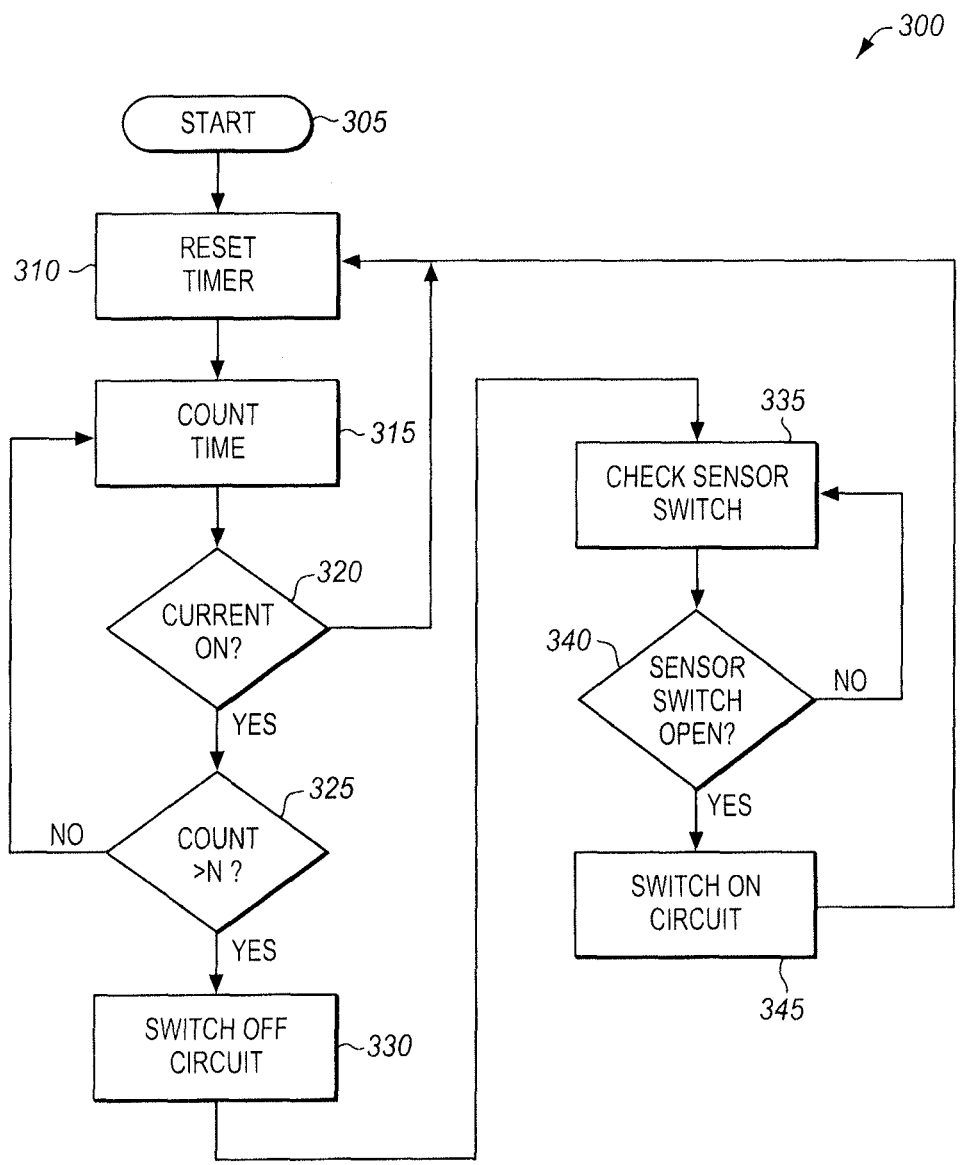

FIG. 3 is an electronic diagram of another preferred embodiment of a circuit 240 according to the invention for lighting an animal wheel. Circuit 240 includes a sensor 250, which is preferably a reed switch, lights 245, which are preferably LEDs, resistors 247, system on/off switch 267, which is preferably a mechanical switch, power source 65, which is preferably a battery, revolution counter and display 270 having a reset input 275, a circuit on control circuit 280, and an open sensor pulse circuit 285. The circuit on control circuit 280 includes a timer comprising oscillator 290 and counter 292 having a reset input 293. The circuit on control circuit 280 also includes logic switch 294. LEDs 245 preferably are connected in parallel between sensor 250 and battery 265, which are connected in series with logic switch 294. Oscillator 290 provides oscillator pulses which are counted with counter 292, which preferably is adjustable. Counter 292 is preferably set so that it provides a pulse to logic switch 294 after a predetermined time, such as two seconds. When logic switch 294 receives a pulse from counter 292, it turns off and also provides a pulse on line 295 to reset input 293 of counter 292 to reset the counter and a pulse on line 297 to reset the open sensor pulser 285. Open sensor pulser 285 provides a pulse on line 297 whenever sensor 250 opens, which pulse closes logic switch 294. Counter 292 also provides a pulse to revolution counter and display 270, which advances one unit for each revolution of the wheel, such as 15. System on/off switch 267 can be used to manually turn circuit 240 on and off. Together, the circuit on sensor circuit 280 and open sensor pulser 285 turn off the circuit 240 if sensor switch 250 is on for the predetermined period, and then turn it back on again after the sensor switch opens. This process flow is shown in FIG. 4. Sensor actuator 230 preferably is attached to animal wheel 15, 215 and is preferably a magnet.

FIG. 4 is a flow chart showing a preferred embodiment of a process according to the invention for turning off the lights of an animal wheel according to the invention if the animal stops turning the wheel while the lights are on. The process 300 starts at 305. At 310, the timer, e.g. counter 292, is reset. The time is counted at 315 as long as the current through the sensor switch is on, which is determined at 320, which cycles the process to 315 if the current is on, and cycles the process to 330 when the time reaches the predetermined time, such as two seconds. At 330, the logic switch 294 switches the circuit 240 off. The Open sensor pulser 285 checks the sensor switch 250 at 235, and as long as it is closed, cycles via 340 and 335. When sensor switch 250 is opened, such as when the animal starts turning the wheel again, the process returns to 310 via 345, the timer 288 is reset, and the count begins again.

Figure 5:
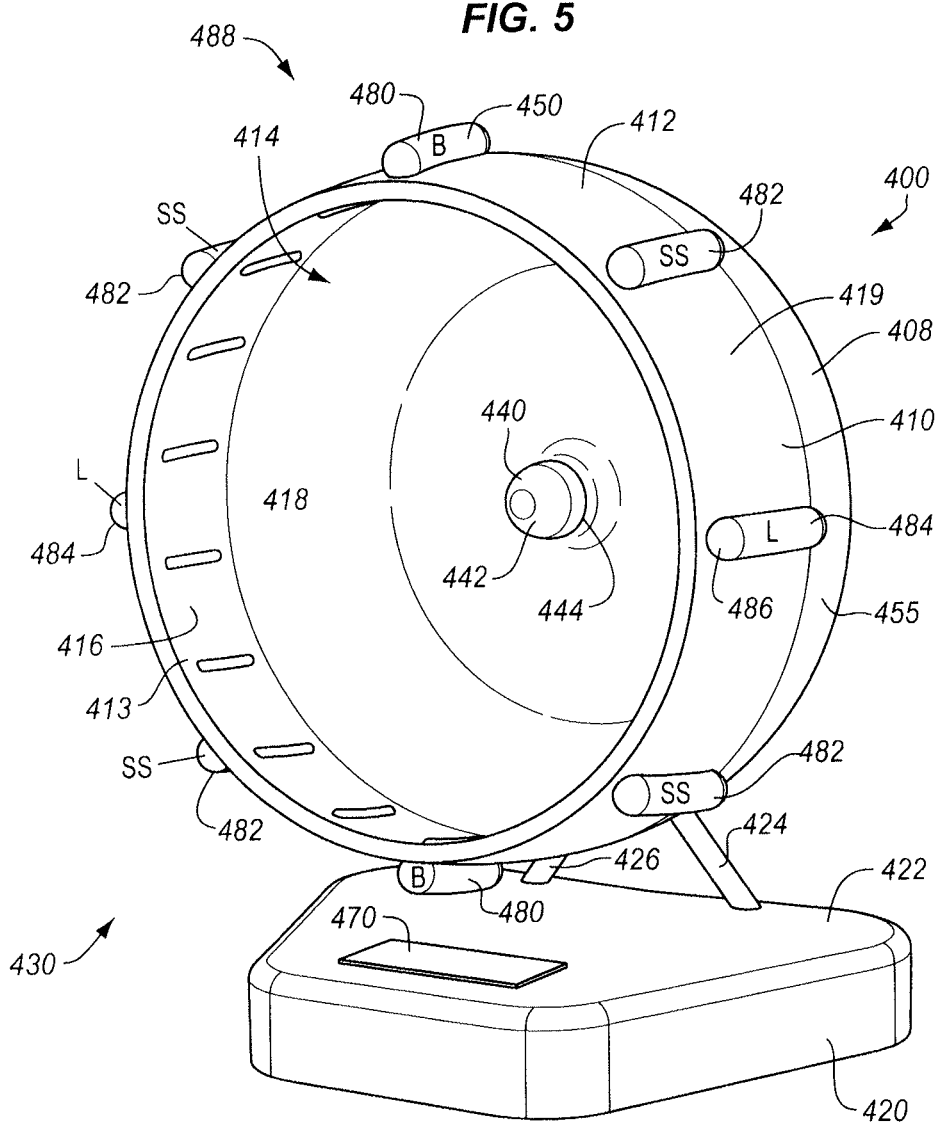
FIG. 5 is a front perspective view of an alternative embodiment of an animal wheel according to the invention that can be illuminated by the action of an animal turning the wheel.
Figure 6:
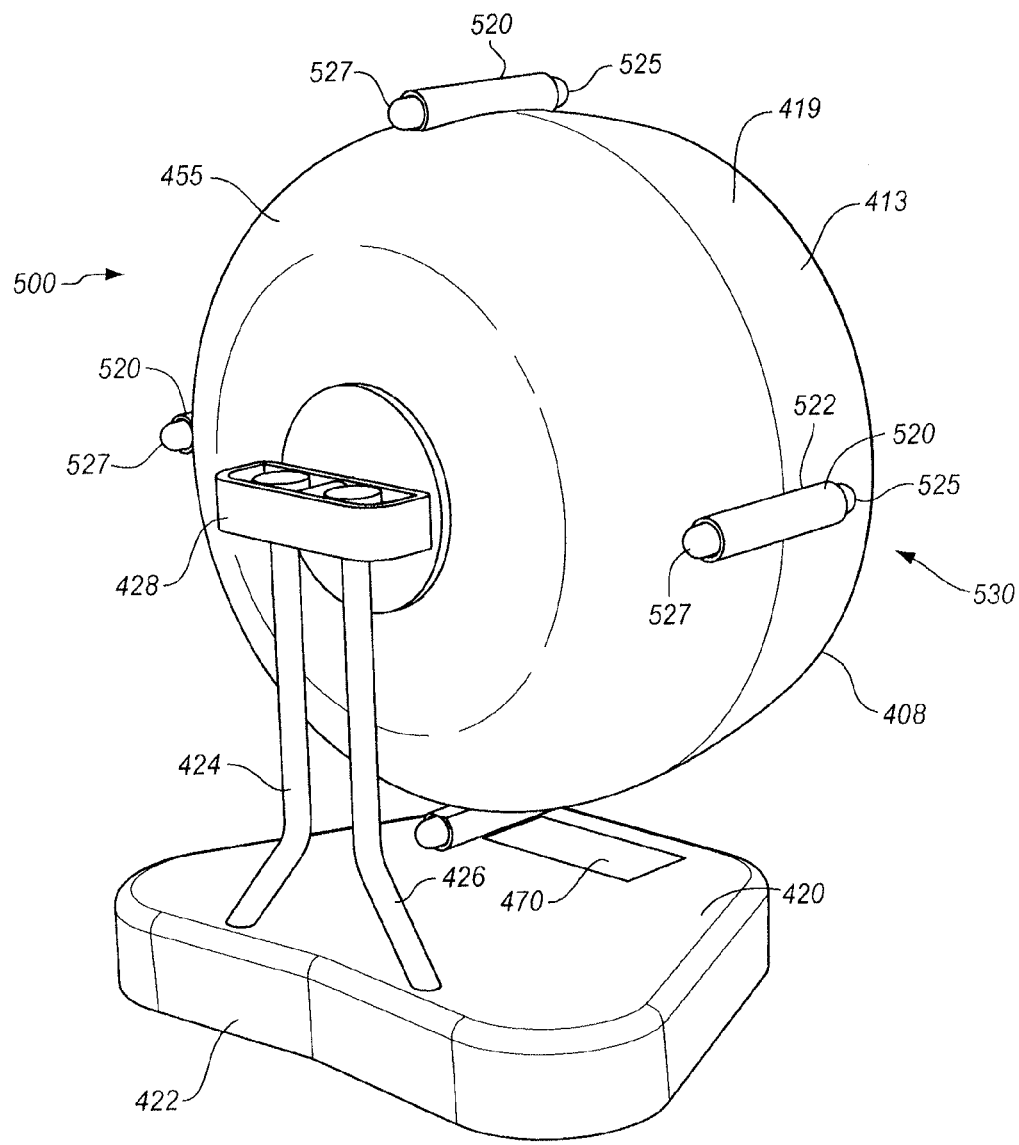
FIG. 6 is a back perspective view of another preferred embodiment of an animal wheel according to the invention that can be illuminated by the action of an animal turning the wheel.

FIG. 5 is a front perspective view of an alternative embodiment of an animal wheel system 400 according to the invention that includes an animal wheel 408 with a built-in lighting system 430 according to the invention that can be illuminated by the action of an animal turning the wheel. Wheel 408 includes a wheel body 410, a stand 420, and an axle mechanism 440. Wheel body 410 is in the shape of a tub 412 having an open end 414. Tub 412 has a cylindrical portion 413 having an inner cylindrical surface 416 with treads 418 and an outer cylindrical surface 419. Stand 420 comprises an enclosed foot portion 422, legs 424 and 426, and an axel support 428 (FIG. 6). Axel mechanism 440 includes an axel 442 and a bearing 444. Wheel 408 is a type of animal wheel that is known in the art; therefore, it will not be described in more detail herein. Lighting system 430 comprises electronic parts located in tubes, such as 450, attached to the outer cylindrical surface 419 and magnet 470 mounted on stand 420. Four tubes 482 enclose a sense switch, indicated by "SS", preferably a reed switch. Two tubes 484, indicated by "L", each have a pair of lights 486, preferably LEDs, attached to either end. Two tubes 480 contain a battery, indicated by "B". The electronic parts are connected into a lighting circuit 488 as shown in any of FIG. 2, 3, or 8, by wiring 455 embedded in wheel 408. If the circuit 488 also includes other elements, such as an oscillator, a counter, logic, etc., this will be included in tubes 482 and 484. The various electronic parts are distributed in the tubes over surface 419 so that the wheel 408 is balanced, or preferably, slightly unbalanced so that the wheel tends to stop in a position in which a tube 482 including a sense switch is not over magnet 470.

Figure 7:
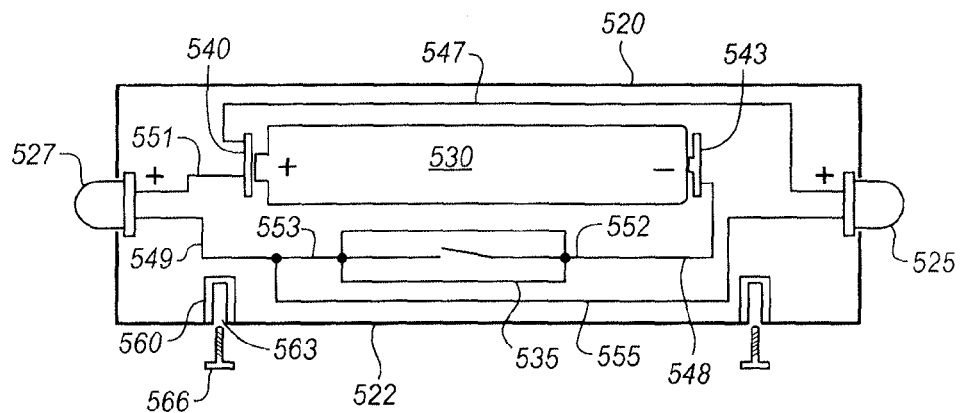
FIG. 7 is a cut-away plan view of a lighting module of FIG. 6.

FIG. 6 is a back perspective view of a wheel system 500 similar to that of FIG. 5 except that the lightings 530 is included in a plurality of tubes 520, each of which contains all of the illumination elements (except the magnet 470) necessary to light the system. The structure of each such tube 520 and its contents is shown in FIG. 7, which is a cutaway drawing of a tube 520 showing the electronic elements 533 inside the tube. Each tube 520 contains a pair of lights 525 and 527, preferably LEDs, a battery 530, which is preferably a AAAA battery, a sense switch 535, which is preferably a reed switch, battery contacts 540 and 543, and connecting wiring 547, 548, 549, 551, and 555. Wire 547 is connected between positive contact 540 and the positive terminal of LED 525, wire 548 is connected between the negative contact 543 and terminal 552 of reed switch 535, wire 549 is connected between the terminal 553 of reed switch 535 and the negative terminal of LED 527, wire 551 is connected between the positive battery contact 540 and the positive terminal of LED 527, and wire 555 is connected between terminal 553 of reed switch 535 and the negative terminal of LED 525. One side 522 of each tube 520 is flattened to fit snuggly against surface 419 of wheel 408. Each tube 520 has a pair of studs 560 with an inner bore 563. Each tube 520 is fastened to wheel surface 419 by screws 566 which pass through wheel cylinder 413 and screw into bores 563 in studs 560. Other attachment systems, such as epoxy, glue, or any other suitable attachment mechanism may be used. Magnet 470 may be attached to the inside or outside of stand 420 using epoxy, glue, or other attachment mechanism. The lighting system 530 may be an after-market system that is sold separately from wheel 408 and attached to wheel 408.

Figure 8:
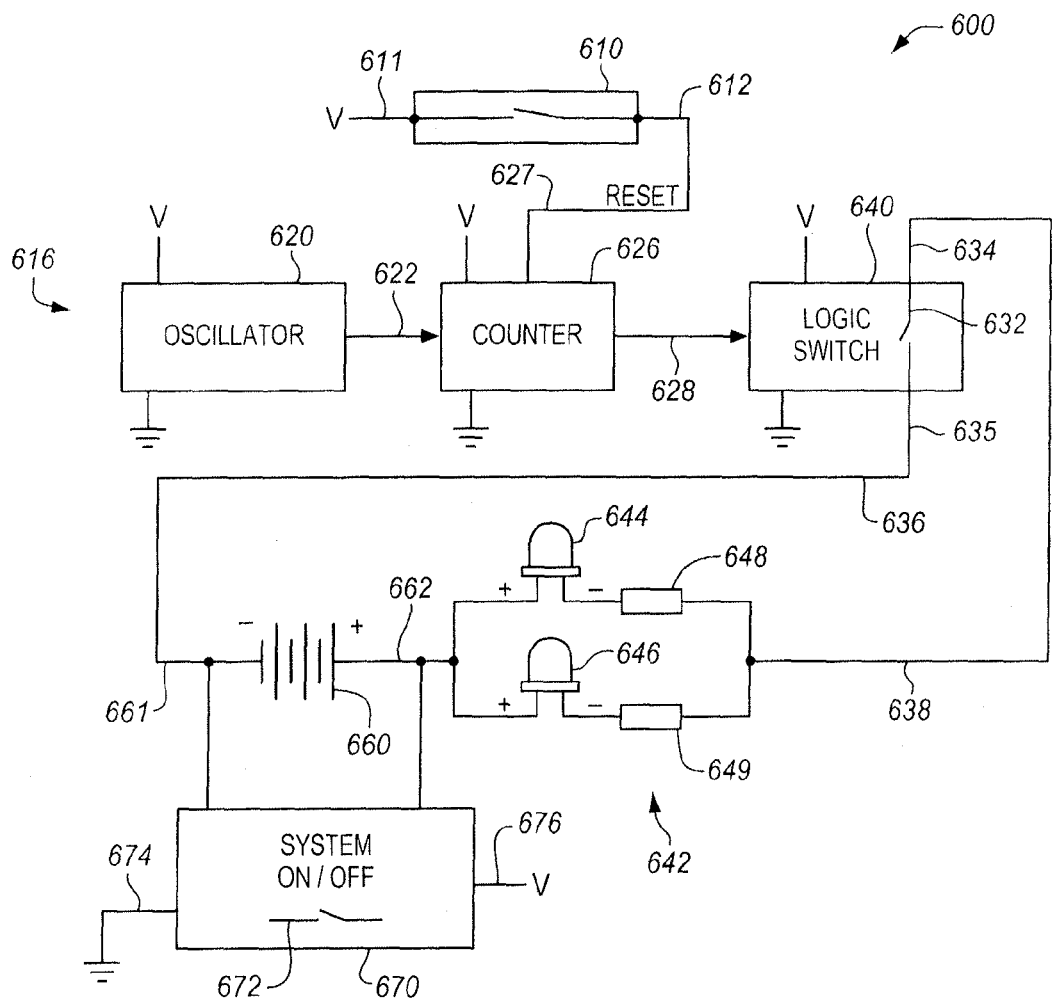
FIG. 8 is an electronic circuit diagram of a preferred embodiment of a circuit according to the invention that turns lights on when the sensor senses movement of an actuator, and automatically turns itself off when movement is no longer sensed.

FIG. 8 is a circuit diagram of another preferred embodiment 600 of a lighting system according to the invention. System 600 mimics a system in which the spinning wheel turns a generator to light the wheel, but is less complex and more reliable than such a system. The magnet is not shown in FIG. 8. Lighting system 600 comprises a sensor 610, preferably a reed switch, a timer circuit 616, preferably including an oscillator 620 and a counter 626, a logic switch 640, a power source 60, light circuit 642, and system on/off circuit 670. Counter 626 includes a reset input 627, and logic switch 640 includes a switch 632, the position of which is determined by a logic state of logic switch 640. Power source 660 is preferably a battery. Light circuit 642 comprises lights 644 and 646, which are preferably LEDs, and preferably includes resistors 648 and 649. System on/of circuit 670 is connected across the voltage source and preferably includes a manual switch 672, a ground terminal 674 and a system voltage terminal 676. Ground 674 and the system voltage, V, are applied to each of the circuit elements 620, 627, and 640. Terminal 611 of sensor 610 is connected to the system voltage V, and terminal 612 is connected to the reset input 627 of counter 626. The output 622 of oscillator 620 is connected to counter 426, and the output 628 of counter 626 is applied to logic switch 640. One terminal 634 of switch 632 is connected to the negative terminals of LEDs 644 and 646 via line 638 and resistors 648 and 649, respectively. The other terminal 635 of switch 632 is connected to the negative terminal 661 of power source 660 via line 636. The positive terminal 662 of power source 660 is connected to the positive terminals of LEDs 644 and 646.

Lighting system 600 operates as follows. When the wheel it is associated with begins to move, sensor switch 610 closes when it is in the vicinity of a sensor actuator, such as a magnet. This pulses the reset input of counter 626, causing it to output an "ON" logic state on its output 628 and to begin counting pulses from oscillator 620. When the "ON" logic state is applied to logic switch 640, switch 632 closes. This lights lights 644 and 646. The lights stay on as long as the "ON" logic state is applied to logic switch 640. As long as the wheel with which the circuit 600 is associated continues to turn, sensor 610 continues to reset counter 626, and counter 626 continues to count and continues to apply the "ON" logic state to its output 628. However, if counter 626 is not reset for a prescribed time, it counts out and outputs an "OFF" logic state on its output 628 which opens switch 632 and turns off lights 644 and 646. The count at which counter 626 counts out is set to a suitably short time such that the lights 644 and 646 appear to go out as soon as, or shortly after, the wheel stops. This prescribed time is preferably less than two seconds, more preferably less than a second, and most preferably less than half a second. Small animals, such as mice, tend to turn their wheels fast enough so that, with just a couple of magnets mounted on the wheel, the time delay between the wheel stopping and the lights going out is not distinguishable by human beings, except by someone who understands what is driving the device and is carefully scrutinizing the timing. Three or four magnets make the time delay even shorter so even someone that knows the design of the device and is watching for time delays cannot tell that the movement of the wheel and the lighting of the lights are not perfectly synchronized. Further, all electrical generator circuits have some capacitance that causes the electricity to continue to flow for an instant after the generation stops, which the short delay between the stoppage of the wheel and the ceasing of the lighting mimics. Thus, the circuit 600 mimics the lighting produced by an animal wheel electrical generator circuit.

Figure 9:
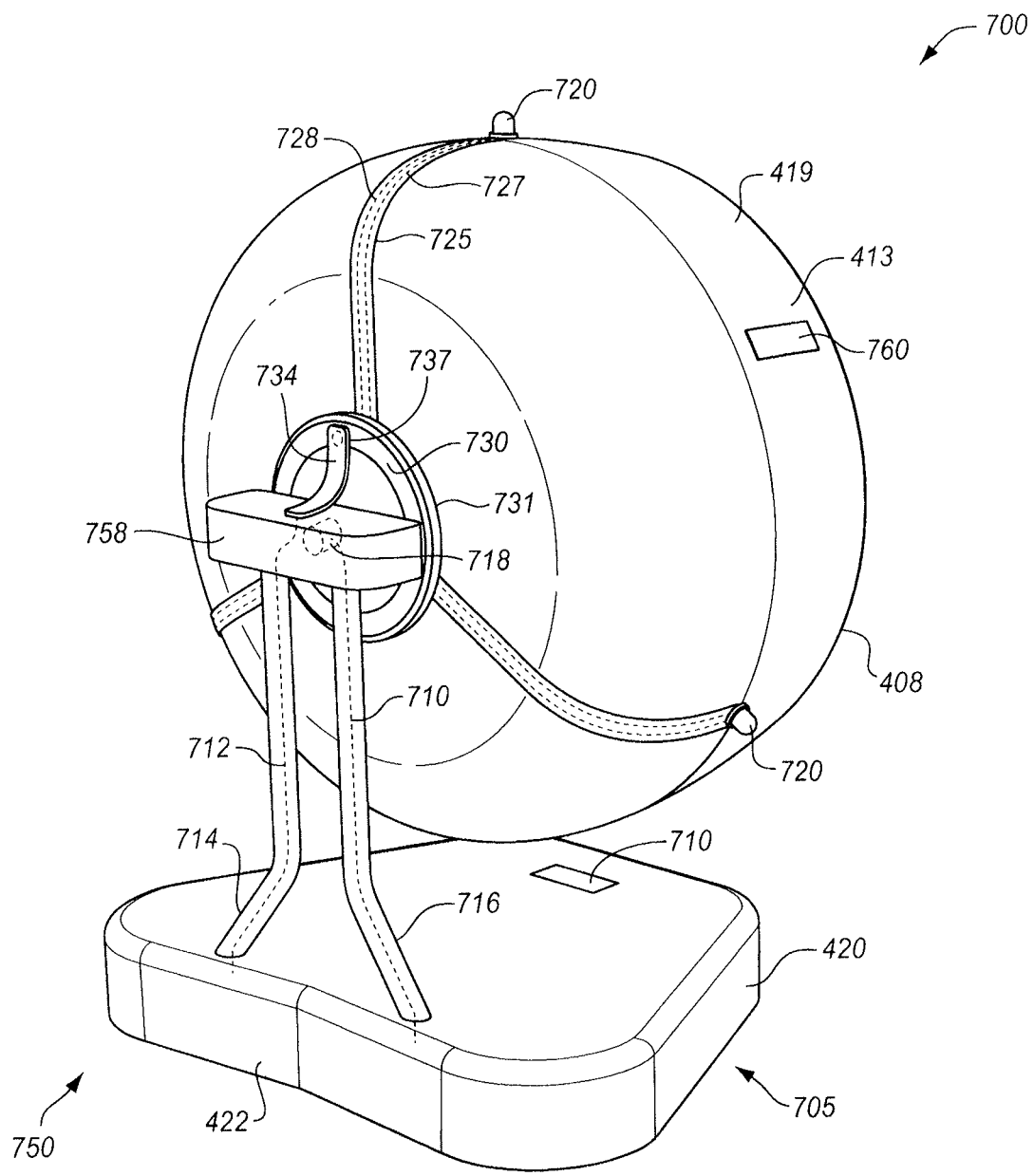
FIG. 9 is another preferred embodiment of an integrated animal wheel and illumination system according to the invention.

FIG. 9 is an alternative embodiment of a lighted animal wheel system 700 according to the invention. System 700 includes an animal wheel 408 and a stand 420 as in the embodiments of FIGS. 5 and 6, except for the differences noted below. However, the lighting system 750 is partially on the wheel 408 and partially in the enclosed foot portion 422 of stand 420. Lights 720, preferably LEDs, are mounted on surface 419 of wheel 408. Sensor actuators, preferably magnets 760, are also mounted on surface 419. In this embodiment, preferably there are three LEDs and three magnets. The power source and a circuit 705, such as shown in FIGS. 2, 3, and 8, without the lights, are enclosed in the foot portion 422 of stand 420. Sensor 710, preferably a reed switch, is located within foot 422, so that magnets 760 pass over it. The circuit 705 and the lights 720 are electrically connected via a conductor 712 that passes through leg 714, a metal spring arm 734, contact 737, and circular conductive trace 730 on the back 731 of wheel 408. Trace 730 is connected via wire 725 to one terminal of light 720. Preferably, wire 725 is covered with a brightly colored flat plastic strip 727 so that it acts as a decorative addition to wheel 408. The return path for the electricity is via a second conductor 728 in or under strip 727 which connects to a metal portion of bearing 718 which connects to a conductor 710 in leg 716 which connects to circuit 705. Bearing 718 and the terminal of conductors 710 and 712 are enclosed by enclosure 758.

A feature of the invention is that the illumination of the lights is triggered by the animal turning the wheel. Another feature of the invention is that the lights are illuminated essentially only in the time that the animal is spinning the wheel. Here, "essentially only in the time that the animal is spinning the wheel" means that the difference between the time that the wheel begins to spin and the time the lights are illuminated is two seconds or less, more preferably a second or less, and most preferably a half-second or less. Preferably, this also means that the difference between the time the wheel stops spinning and the lights go out is two seconds or less, more preferably a second or less, and most preferably a half-second or less. This creates the illusion that the animal is generating the electricity that illuminates the lights. A prototype mouse wheel as in FIG. 1 was demonstrated by the inventor in a confidential private test to approximately twenty witnesses. This prototype used a type HCH9216 6/9 reed switch manufactured by Hasco Components of New Hyde Park, N.Y. 11040. The witnesses uniformly thought that the mouse was generating the electricity by turning the wheel, and generated many different theories of how the device operated, such as the theory that the housing 40 enclosed an inductor in which the magnets generated a current. The test audience included a half-dozen children who were genuinely attracted by the device. The mouse seemed to enjoy the lights also, as it stayed spinning the wheel for nearly an hour.

Now that the value of imitating the functionality of an animal wheel that generates electricity with an animal wheel powered by a battery is presented, those not so skilled in the art can copy the device and try to get around the claims by substituting other switches and switch actuators. For example, a coil can be substituted for the reed switch, and an EMF generator can be substituted for the magnets, or even a mechanical switch can be devised that physically contacts the animal wheel, particularly with the circuit of FIG. 8.

A feature of the invention is that it provides, for the first time, a battery-powered lighted animal wheel. Another feature is that the invention provides a lighted animal wheel in which the lighting is triggered when an illumination switch is adjacent to a switch actuator, which lighted animal wheel also includes a circuit that turns off the lights if the wheel stops in a position in which the switch actuator is adjacent to the switch actuator and, thus, would otherwise keep the light(s) illuminated. Another feature of the invention is that it provides a lighted animal wheel in which the lighting is triggered when an illumination switch is adjacent to a switch actuator, which lighted animal wheel also includes a circuit that holds the light(s) continuously activated until the wheel stops. The fact that the wheel is stopped is determined by the fact that the switch stops sending triggering signals for a predetermined time, such as two seconds, or more preferably a second, and most preferably a half-second.

There has been described a novel lighted animal wheel that strongly enhances the attractiveness of such an animal wheel to children and other people. At the same time, the present lighted animal wheel has a much less complex design than previous lighted wheels. It should be understood that the specific formulations and methods described herein are exemplary and should not be construed to limit the invention, which will be described in the claims below. Further, it is evident that those skilled in the art may now make numerous uses and modifications of the specific embodiments described without departing from the inventive concepts. As one example, one or more batteries may be used; that is, the elements of the device may be incorporated with a coin type battery, a rechargeable type battery, a type A, type AA, type AAA, type AAAA, type C, or type D battery, camera batteries, watch batteries, and any other type of battery. This also may include any battery chemistry including, but not limited to, zinc-carbon batteries, alkaline batteries, and lithium ion batteries. Any of the embodiments, particularly that of FIG. 7, may be plugged into an AC circuit. Any of the parts of any one of the embodiments may be combined with any of the parts of any of the other embodiments. Equivalent structures and processes may be substituted for the various structures and processes described; the subprocesses of the inventive method may, in some instances, be performed in a different order; or a variety of different materials and elements may be used. Consequently, the invention is to be construed as embracing each and every novel feature and novel combination of features present in and/or possessed by the small animal exercise device described.

I claim:

1. A method of lighting a rotatable animal wheel, said method comprising:
   providing one or more lights;
   illuminating one or more of said lights;
   said illumination including triggering said illumination of said one or more lights by the rotation of said rotatable animal wheel; and
   stopping said illumination of said one or more lights when said rotatable animal wheel stops rotating;
   wherein said triggering comprises either opening or closing a reed switch.

2. A method as in claim 1 wherein said illumination begins within two seconds of said animal wheel beginning to rotate.

3. A method as in claim 1 wherein said illumination stops within two seconds of said animal wheel ceasing to rotate.

4. A method as in claim 1 wherein said triggering comprises switching said reed switch with a magnet, and said stopping comprises turning off said illumination with a second switch when said reed switch fails to open within a predetermined time.

5. A method as in claim 1 wherein said illumination is continuous between said triggering and said stopping.

6. A method as in claim 1 wherein said illumination comprises flashing said lights at a frequency determined by the speed of rotation of said rotatable animal wheel.

* * * * *